(12) United States Patent
Luo et al.

(10) Patent No.: US 10,075,266 B2
(45) Date of Patent: Sep. 11, 2018

(54) DATA TRANSMISSION SCHEME WITH UNEQUAL CODE BLOCK SIZES

(71) Applicant: QUALCOMM Incorporated, San Diego, CA (US)

(72) Inventors: Tao Luo, San Diego, CA (US); Peter Gaal, San Diego, CA (US); Wanshi Chen, San Diego, CA (US); Aleksandar Damnjanovic, Del Mar, CA (US); Hao Xu, San Diego, CA (US); Michael Mao Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/507,748

(22) Filed: Oct. 6, 2014

(65) Prior Publication Data

US 2015/0098420 A1    Apr. 9, 2015

Related U.S. Application Data

(60) Provisional application No. 61/889,021, filed on Oct. 9, 2013.

(51) Int. Cl.
*H04L 5/00* (2006.01)
*H04W 72/04* (2009.01)
*H04L 1/00* (2006.01)

(52) U.S. Cl.
CPC ............ *H04L 5/003* (2013.01); *H04L 1/0025* (2013.01); *H04L 1/0089* (2013.01);
(Continued)

(58) Field of Classification Search
CPC .............................. H04L 1/0025; H04L 5/003
(Continued)

(56) References Cited

U.S. PATENT DOCUMENTS 5,990,810 A * 11/1999 Williams .............. G06F 3/0608
                                                     341/51
8,320,319 B2 * 11/2012 Lohr ................... H04W 72/042
                                                     370/252
(Continued)

FOREIGN PATENT DOCUMENTS

CN        101136676 A        3/2008
CN        101855855 A       10/2010
(Continued)

OTHER PUBLICATIONS

3GPP 36.213 ver. 10.10.0, Jun. 2013.*
International Search Report and Written Opinion—PCT/US2014/059516—ISA/EPO—Feb. 5, 2015.

*Primary Examiner* — Mark Rinehart
*Assistant Examiner* — Peter G Solinsky
(74) *Attorney, Agent, or Firm* — Arent Fox, LLP

(57) ABSTRACT

A method, an apparatus, and a computer program product for wireless communication are provided. The apparatus generates a data transport block, divides the data transport block into a number of sub-blocks. The sub-blocks include at least a first sub-block and a second sub-block, where a size of the first sub-block is different than a size of the second sub-block. The apparatus may encode the number of sub-blocks using different code rates and/or different coding schemes. The apparatus may modulate the encoded sub-blocks using different modulation orders. The apparatus transmits the sub-blocks to a receiver.

38 Claims, 15 Drawing Sheets

(52) U.S. Cl.
CPC ......... *H04L 5/0046* (2013.01); *H04W 72/044* (2013.01); *H04L 5/0058* (2013.01)

(58) Field of Classification Search
USPC ........................................................ 370/329
See application file for complete search history.

(56) References Cited

U.S. PATENT DOCUMENTS

| | | | | |
|---|---|---|---|---|
| 8,832,519 B2* | 9/2014 | Li | ........................ | H04L 1/0041 370/473 |
| 2003/0156648 A1* | 8/2003 | Holcomb | ............. | H04N 19/136 375/240.18 |
| 2005/0084031 A1* | 4/2005 | Rosen | ..................... | H04B 1/69 375/295 |
| 2005/0195890 A1* | 9/2005 | Tomoe | ................ | G06F 11/3648 375/219 |
| 2007/0014297 A1* | 1/2007 | Liebchen | ................ | G10L 19/12 370/395.64 |
| 2007/0126612 A1* | 6/2007 | Miller | ................... | H04L 1/0083 341/67 |
| 2008/0056140 A1* | 3/2008 | Shida | ................... | H04B 7/0417 370/242 |
| 2008/0298224 A1* | 12/2008 | Pi | ......................... | H04L 5/0007 370/204 |
| 2008/0304513 A1* | 12/2008 | Oh | ........................ | G10L 19/008 370/464 |
| 2009/0161649 A1* | 6/2009 | Ponnathota | ............ | H04B 1/707 370/342 |
| 2009/0316677 A1* | 12/2009 | Kikuchi | ................ | H04L 1/0068 370/345 |
| 2010/0031110 A1* | 2/2010 | Seok | ..................... | H04L 1/1822 714/748 |
| 2010/0260180 A1* | 10/2010 | Wu | ....................... | H04L 1/1819 370/390 |
| 2011/0085453 A1* | 4/2011 | Wu | ....................... | H04L 5/0007 370/252 |
| 2011/0176502 A1* | 7/2011 | Chung | ................ | H04W 72/042 370/329 |
| 2011/0185249 A1* | 7/2011 | Jongren | .................. | H04L 5/003 714/748 |
| 2011/0200002 A1* | 8/2011 | Han | ....................... | H04L 27/261 370/329 |
| 2011/0223924 A1* | 9/2011 | Lohr | .................... | H04W 72/042 455/450 |
| 2013/0039423 A1* | 2/2013 | Helle | .................... | H04N 19/197 375/240.13 |
| 2013/0170407 A1* | 7/2013 | Liang | .................... | H04L 1/1607 370/280 |
| 2014/0072020 A1* | 3/2014 | Murphy | .............. | H04L 27/0014 375/224 |
| 2014/0177541 A1* | 6/2014 | Li | ......................... | H04L 5/0023 370/329 |
| 2014/0177713 A1* | 6/2014 | Yuan | ................ | H04N 19/00533 375/240.12 |
| 2014/0269452 A1* | 9/2014 | Papasakellariou | ... | H04B 7/2643 370/280 |
| 2014/0301331 A1* | 10/2014 | Niewczas | ............. | H04L 1/0035 370/329 |
| 2015/0067435 A1* | 3/2015 | Yerramalli | ............ | H04L 1/0006 714/748 |
| 2015/0071099 A1* | 3/2015 | Yi | ......................... | H04B 7/2656 370/252 |
| 2015/0181534 A1* | 6/2015 | Andersson | ............ | H04L 1/0015 370/311 |
| 2015/0289237 A1* | 10/2015 | Kim | ...................... | H04L 27/26 370/329 |
| 2015/0382336 A1* | 12/2015 | Zhang | ................... | H04W 16/32 370/329 |
| 2016/0205695 A1* | 7/2016 | Kishiyama | .......... | H04W 72/082 370/315 |
| 2016/0267916 A1* | 9/2016 | You | ........................ | G10L 19/008 |

FOREIGN PATENT DOCUMENTS

| | | |
|---|---|---|
| EP | 1895700 A2 | 3/2008 |
| EP | 2306659 A2 | 4/2011 |
| WO | 2007132329 A2 | 11/2007 |

* cited by examiner

DATA TRANSMISSION SCHEME WITH UNEQUAL CODE BLOCK SIZES

CROSS-REFERENCE TO RELATED APPLICATION

This application claims the benefit of U.S. Provisional Application Ser. No. 61/889,021 entitled "DATA TRANSMISSION SCHEME WITH UNEQUAL CODE BLOCK SIZES" and filed on Oct. 9, 2013, which is expressly incorporated by reference herein in its entirety.

BACKGROUND

Field

The present disclosure relates generally to communication systems, and more particularly, to a data transmission scheme with unequal code block sizes.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus generates a data transport block, divides the data transport block into a number of sub-blocks. The sub-blocks include at least a first sub-block and a second sub-block, where a size of the first sub-block is different than a size of the second sub-block. The apparatus may encode the number of sub-blocks using different code rates and/or different coding schemes. The apparatus may modulate the encoded sub-blocks using different modulation orders. The apparatus transmits the sub-blocks to a receiver. Therefore, by varying the characteristics (e.g., block size, code rate, and/or modulation order) of one or more sub-blocks, a receiver may have a higher probability of successfully decoding at least some encoded sub-blocks over other encoded sub-blocks in poor channel conditions. Accordingly, information determined by decoding those encoded sub-blocks may be used to improve channel estimation for other encoded sub-blocks.

In an aspect of the disclosure, a method, a computer program product, and an apparatus are provided. The apparatus receives a number of encoded sub-blocks associated with a data transport block. The encoded sub-blocks include at least a first encoded sub-block and a second encoded sub-block, where a size of the first encoded sub-block is different than a size of the second encoded sub-block. The apparatus decodes at least the first and second encoded sub-blocks.

DETAILED DESCRIPTION

Figure 1:
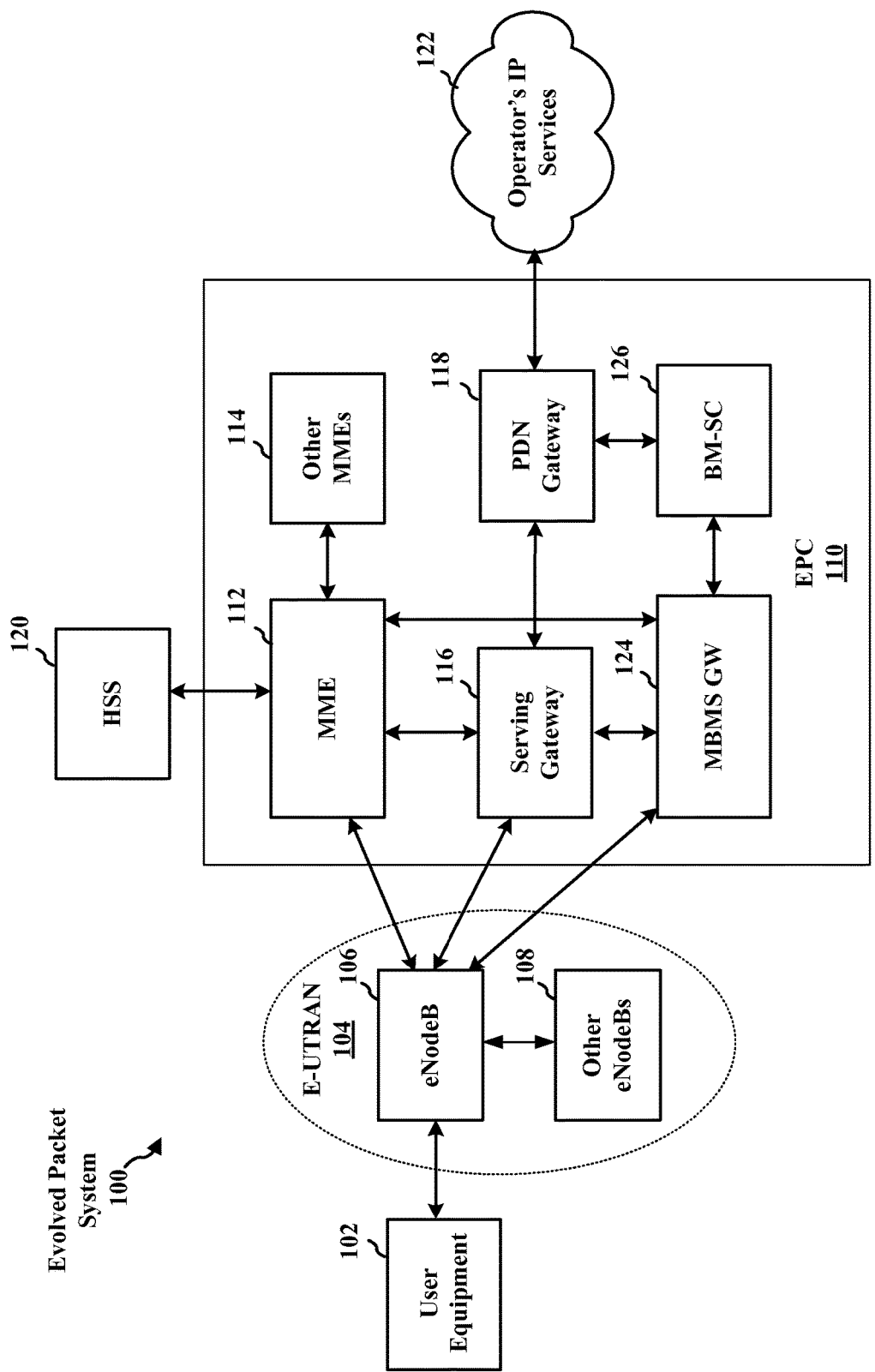
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
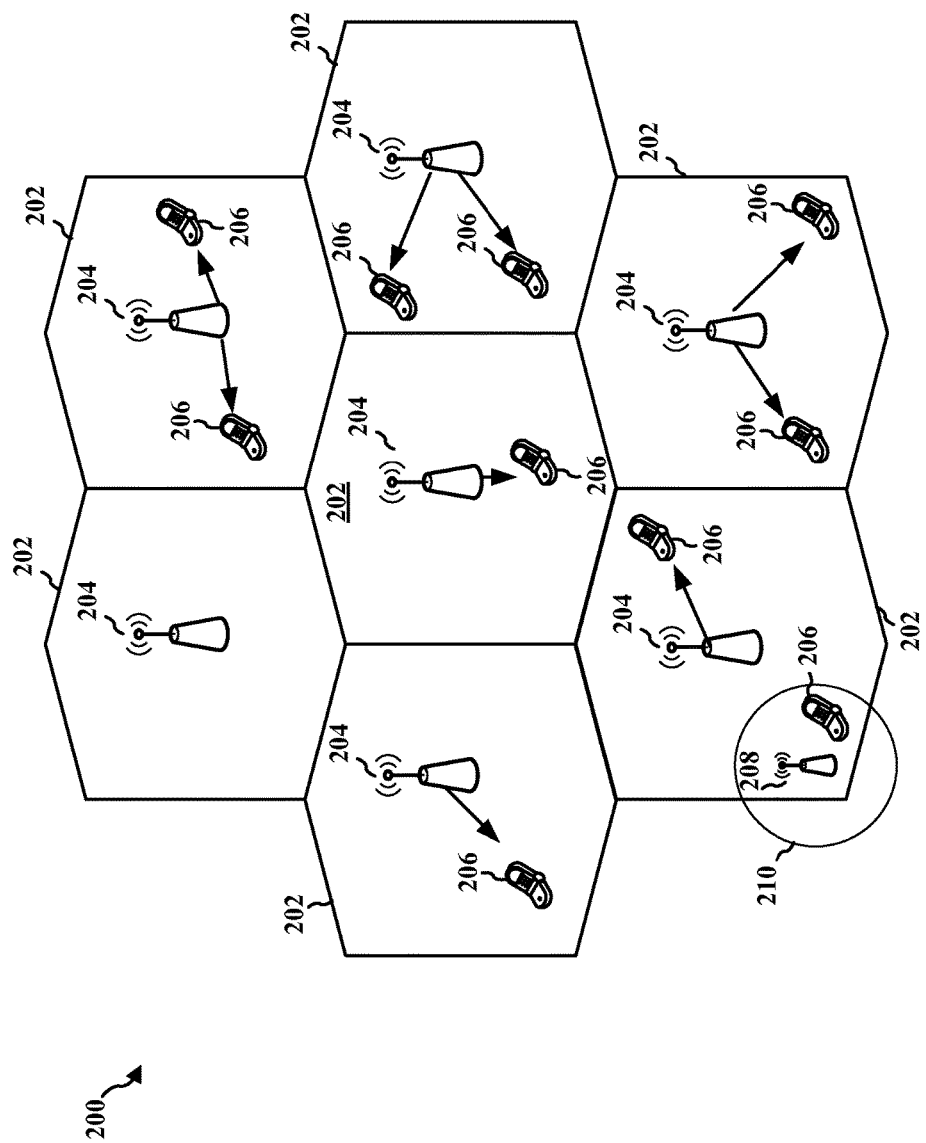
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sector). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
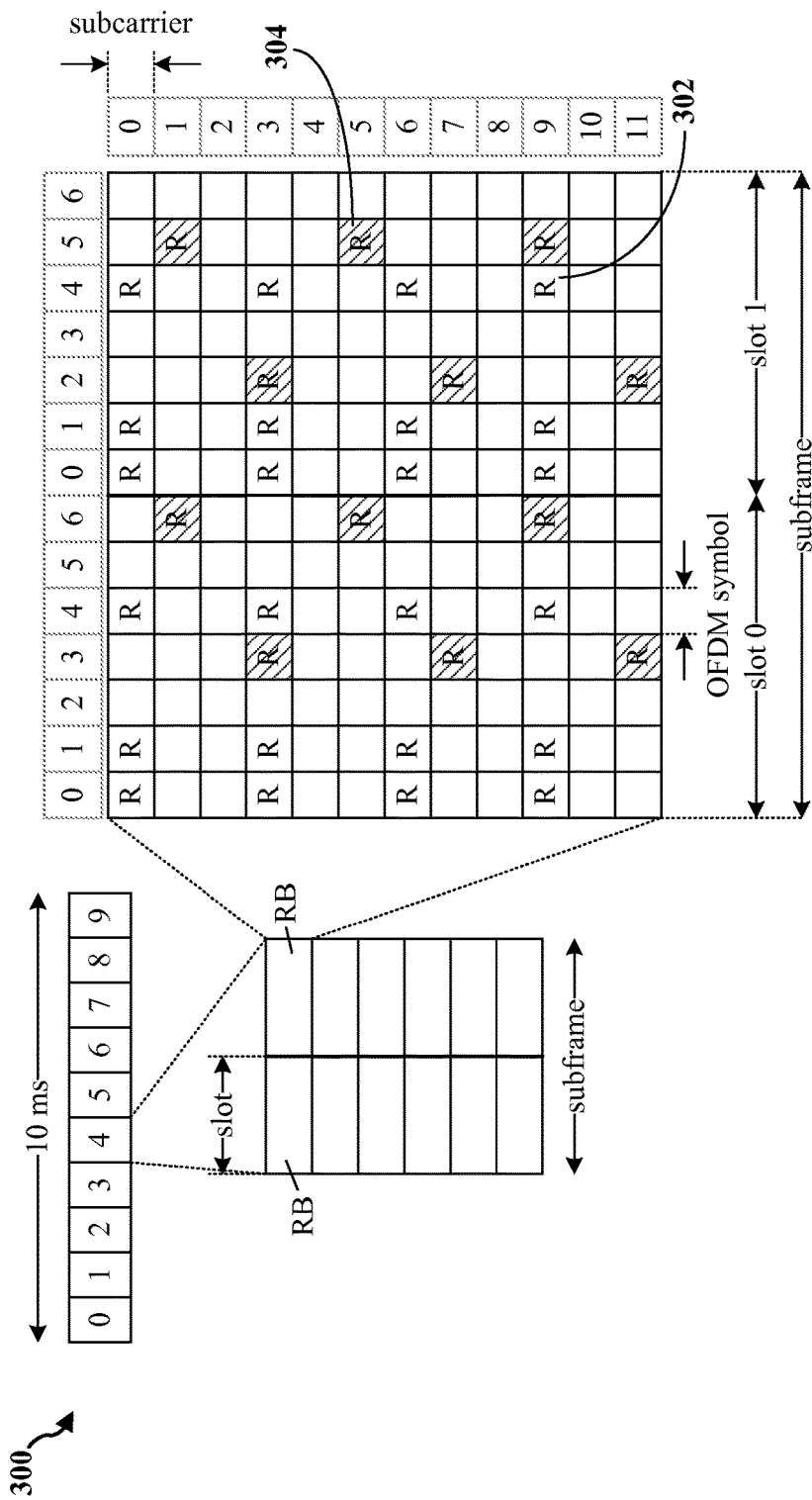
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, for a total of 84 resource elements. For an extended cyclic prefix, a resource block contains 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
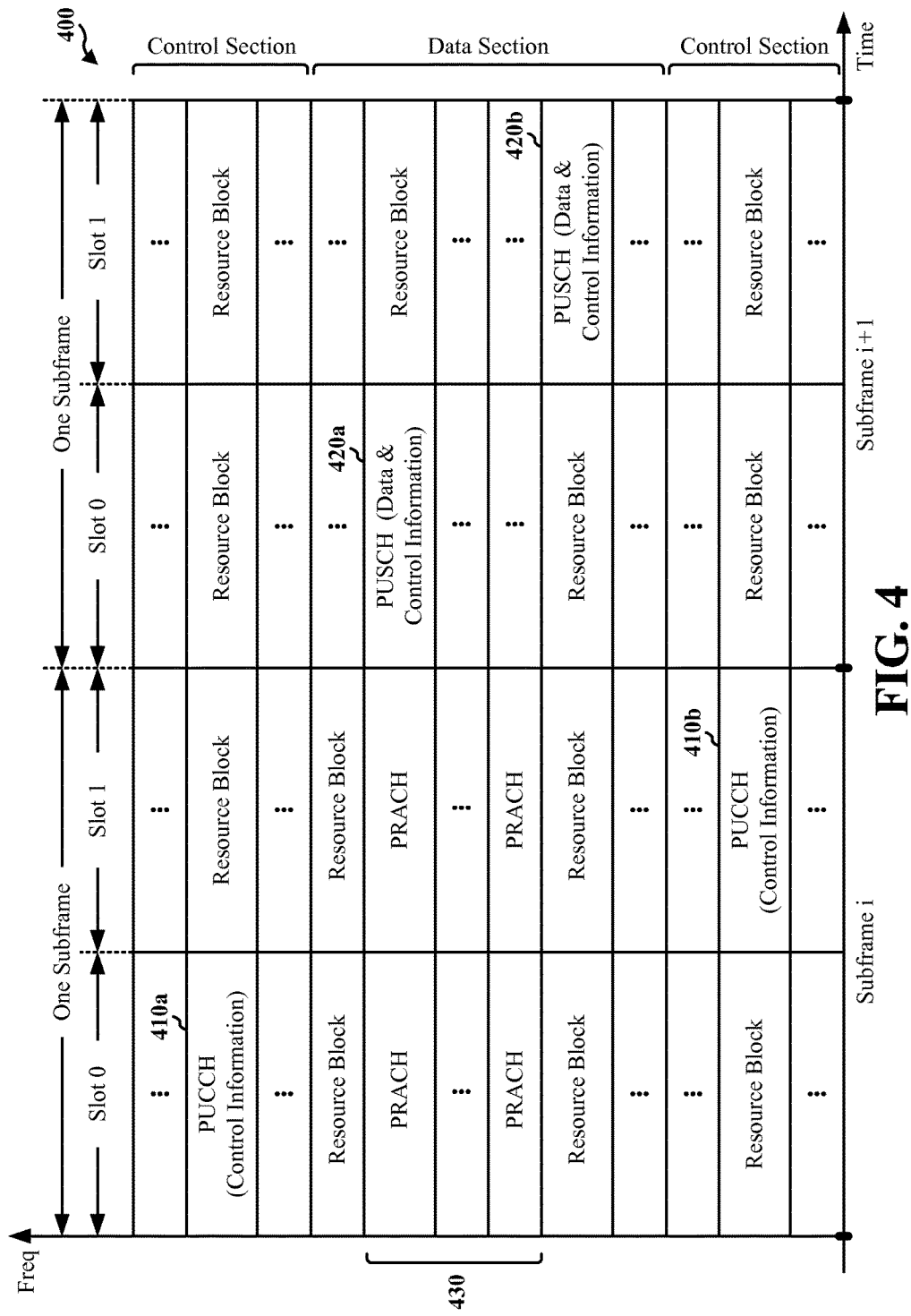
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
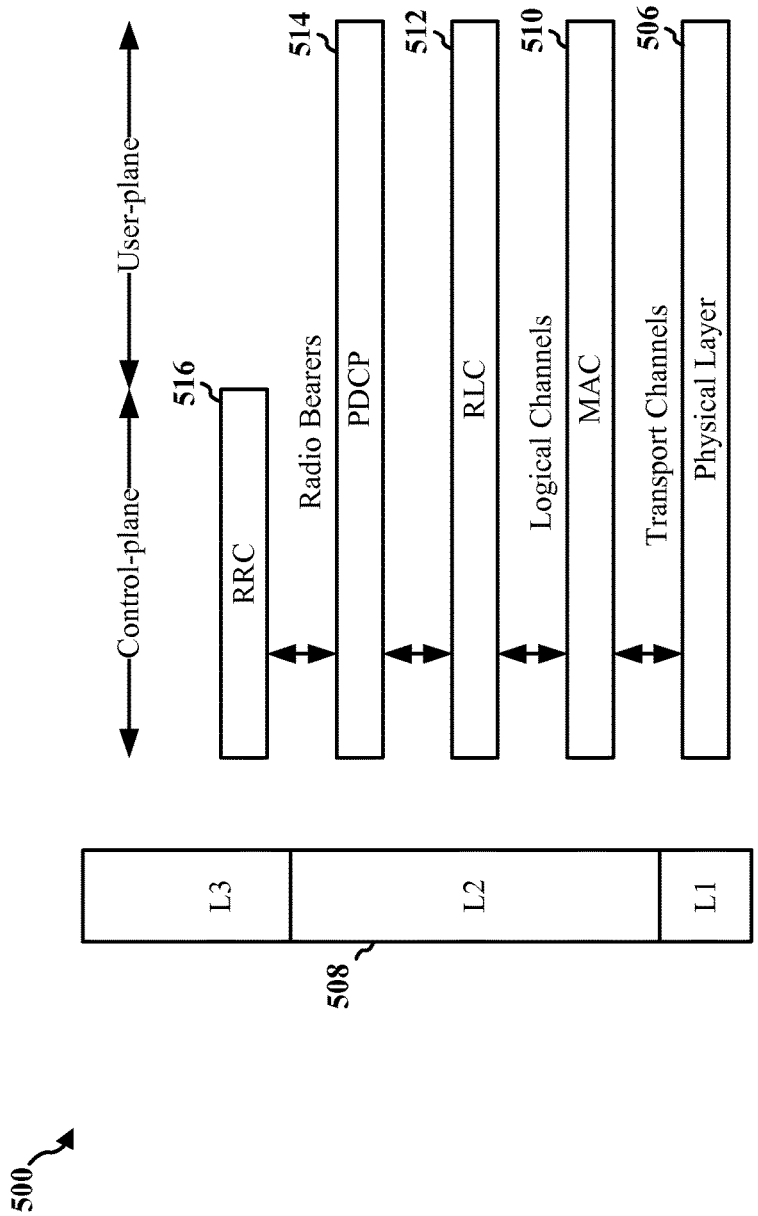
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
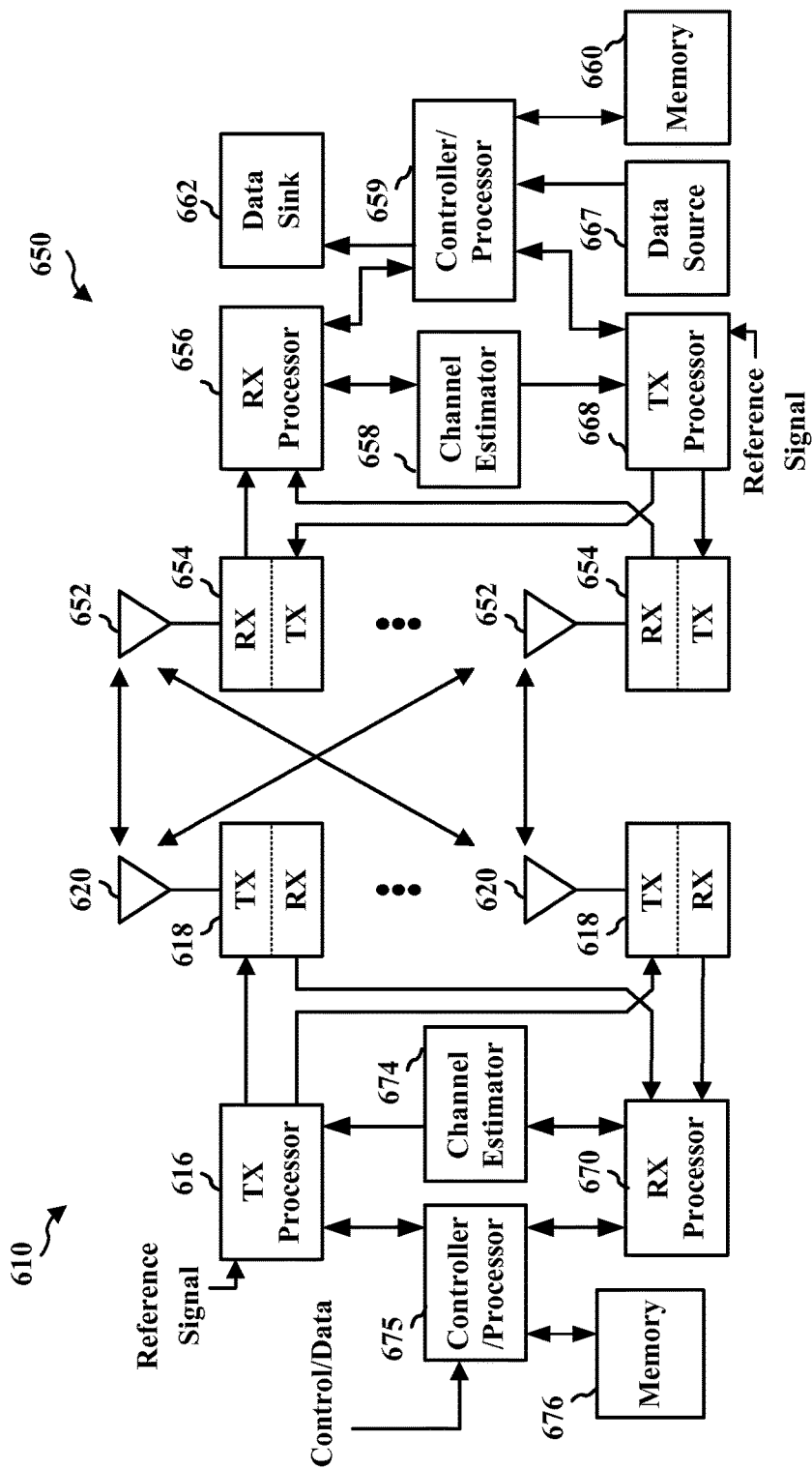
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
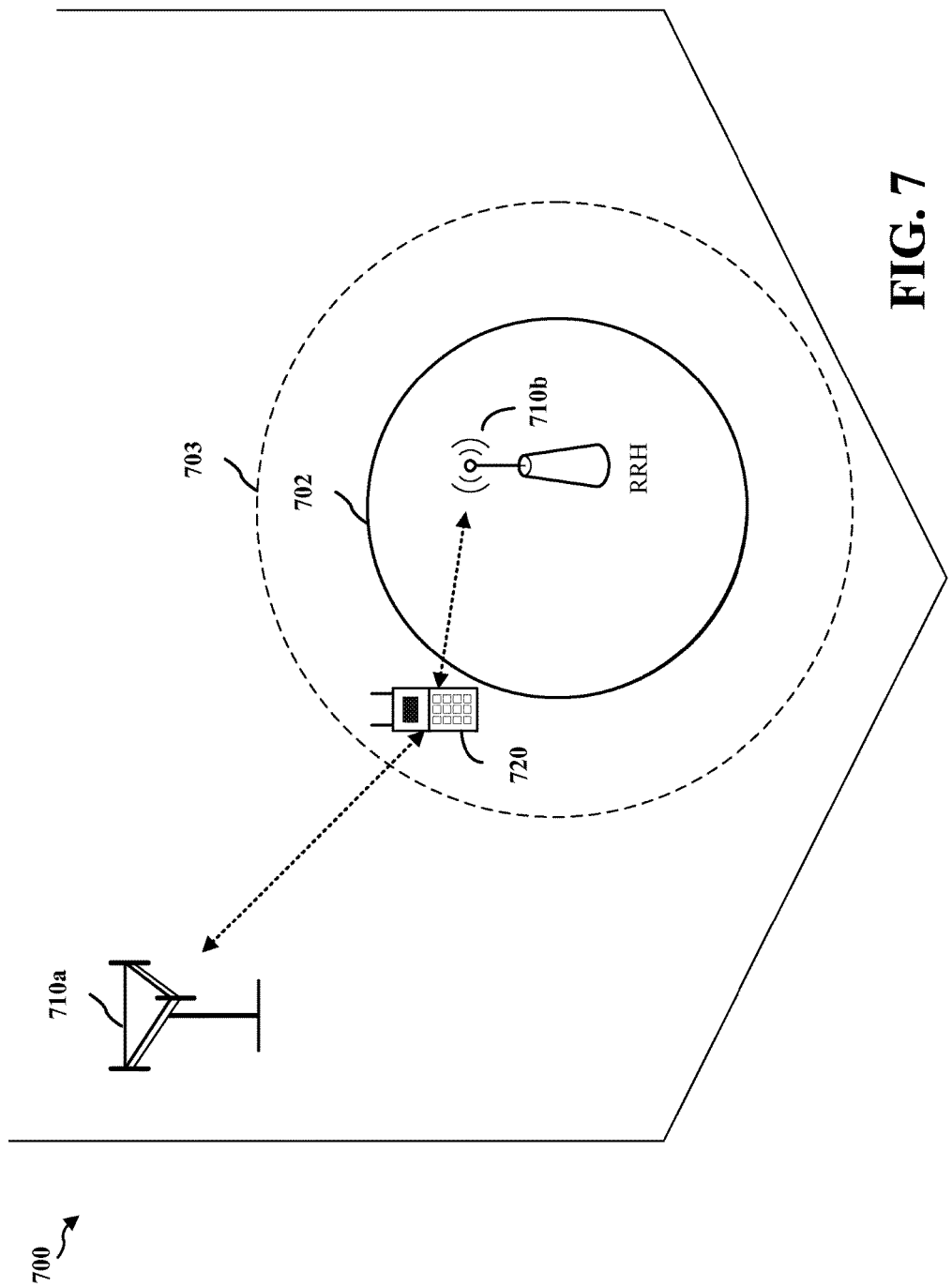
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710b may have a range expanded cellular region 703 that is expanded from the cellular region 702 through enhanced inter-cell interference coordination between the RRH 710b and the macro eNB 710a and through interference cancellation performed by the UE 720. In enhanced inter-cell interference coordination, the RRH 710b receives information from the macro eNB 710a regarding an interference condition of the UE 720. The information allows the RRH 710b to serve the UE 720 in the range expanded cellular region 703 and to accept a handoff of the UE 720 from the macro eNB 710a as the UE 720 enters the range expanded cellular region 703.

Figure 8:
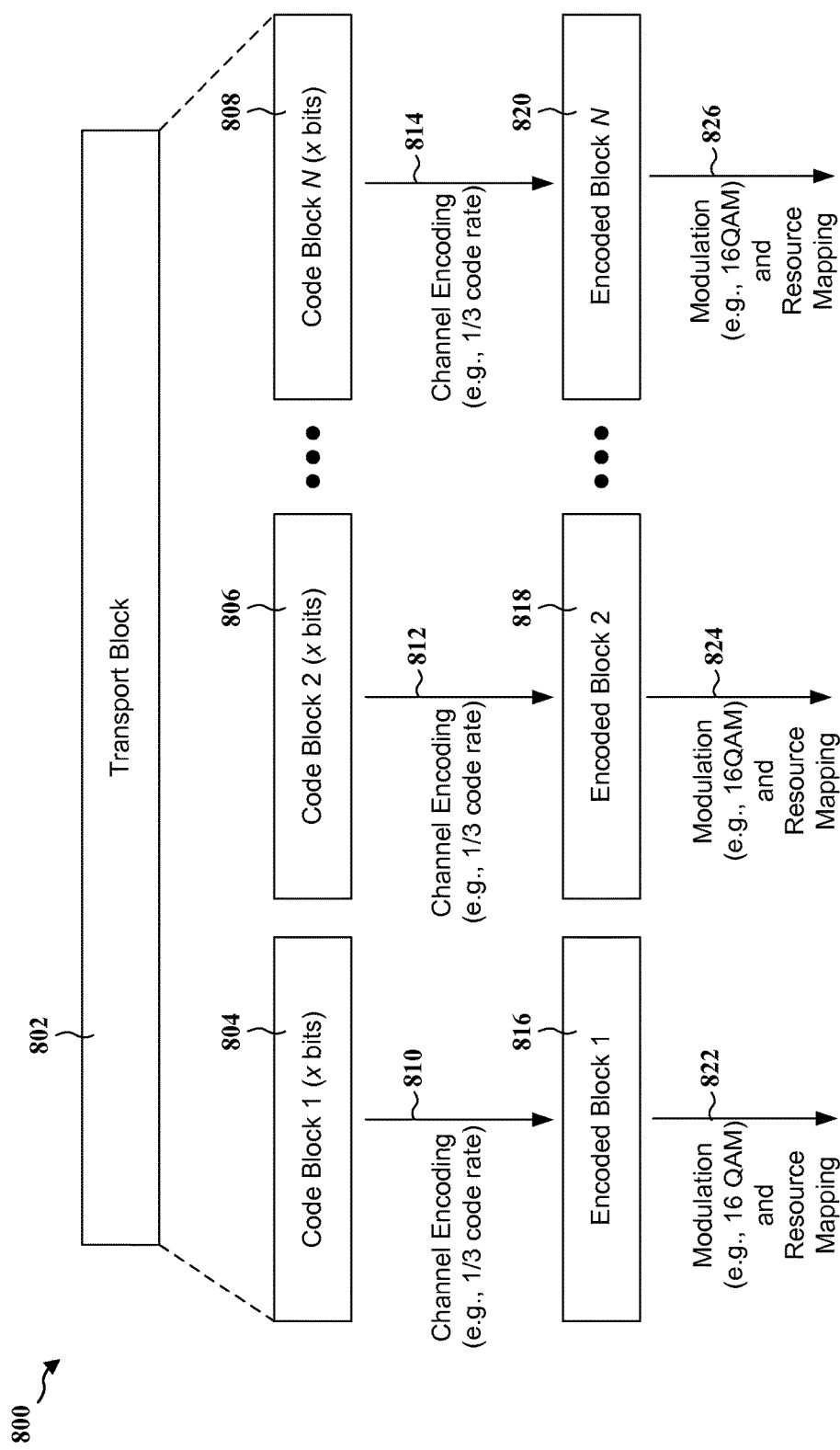
FIG. 8 is a diagram illustrating a conventional data transmission scheme of a conventional transmitter.

FIG. 8 is a diagram 800 illustrating a conventional data transmission scheme of a transmitter in LTE. As shown in FIG. 8, a transport block 802 may be divided into two or more smaller code blocks (also referred to as sub-blocks), such as code block 1 804, code block 2 806, and code block N 808, where each of the code blocks have the same block size (e.g., x bits). Each code block is then independently channel encoded (e.g., Turbo encoded) using the same code rate. For example, channel encoding 810 is performed on code block 1 804 to generate encoded block 1 816, channel encoding 812 is performed on code block 2 806 to generate encoded block 2 818, and channel encoding 814 is performed on code block N 808 to generate encoded block N 820. In such example, the same code rate (e.g., ⅓ code rate) is used for channel encoding 810, 812, and 814. As further shown in FIG. 8, the encoded block 1 816, encoded block 2 818, and encoded block N 820 are each modulated using the same modulation order and mapped to a number of resources (e.g., resource elements). For example, the encoded block 1 816 is modulated 822 using 16 QAM, the encoded block 2 818 is modulated 824 using 16 QAM, and the encoded block N 820 is modulated 826 using 16 QAM.

The encoded block 1 816, encoded block 2 818, and encoded block N 820 may be sequentially mapped to resource elements (REs). For downlink transmissions, the mapping is performed based on a frequency allocation followed by a time allocation. For uplink transmissions, the mapping is performed based on a time allocation followed by a frequency allocation. One or more reference signals, such as common reference signals or dedicated reference signals, may be frequency division multiplexed with those tones for data. It should be noted that there is a tradeoff between the number of tones used for reference signals and the number of tones used for data tones because, while presence of additional reference signals improves the channel estimate, as the number of reference signals increase the available REs for transmission decline, thereby reducing throughput.

In conventional designs where multiple encoded blocks need to be decoded, due to limited number of reference signals, the decoding performance may vary from encoded block to encoded block depending on the position of the encoded blocks relative to the reference signal. Although information determined by decoding encoded blocks or soft bits from some encoded blocks may be used to improve channel estimation for other encoded blocks, the characteristics of the encoded blocks in conventional designs may result in a low probability for a successful decoding of any of the encoded blocks in poor channel conditions. For example, the characteristics of the encoded blocks in conventional designs may include relatively the same size, code rate, and modulation order. However, by varying the characteristics (e.g., block size, code rate, and/or modulation order) of one or more encoded blocks, a receiver may have a higher probability of successfully decoding at least some encoded blocks over other encoded blocks in poor channel conditions. Accordingly, information determined by decoding those encoded blocks may be used to improve channel estimation for other encoded blocks.

Figure 9:
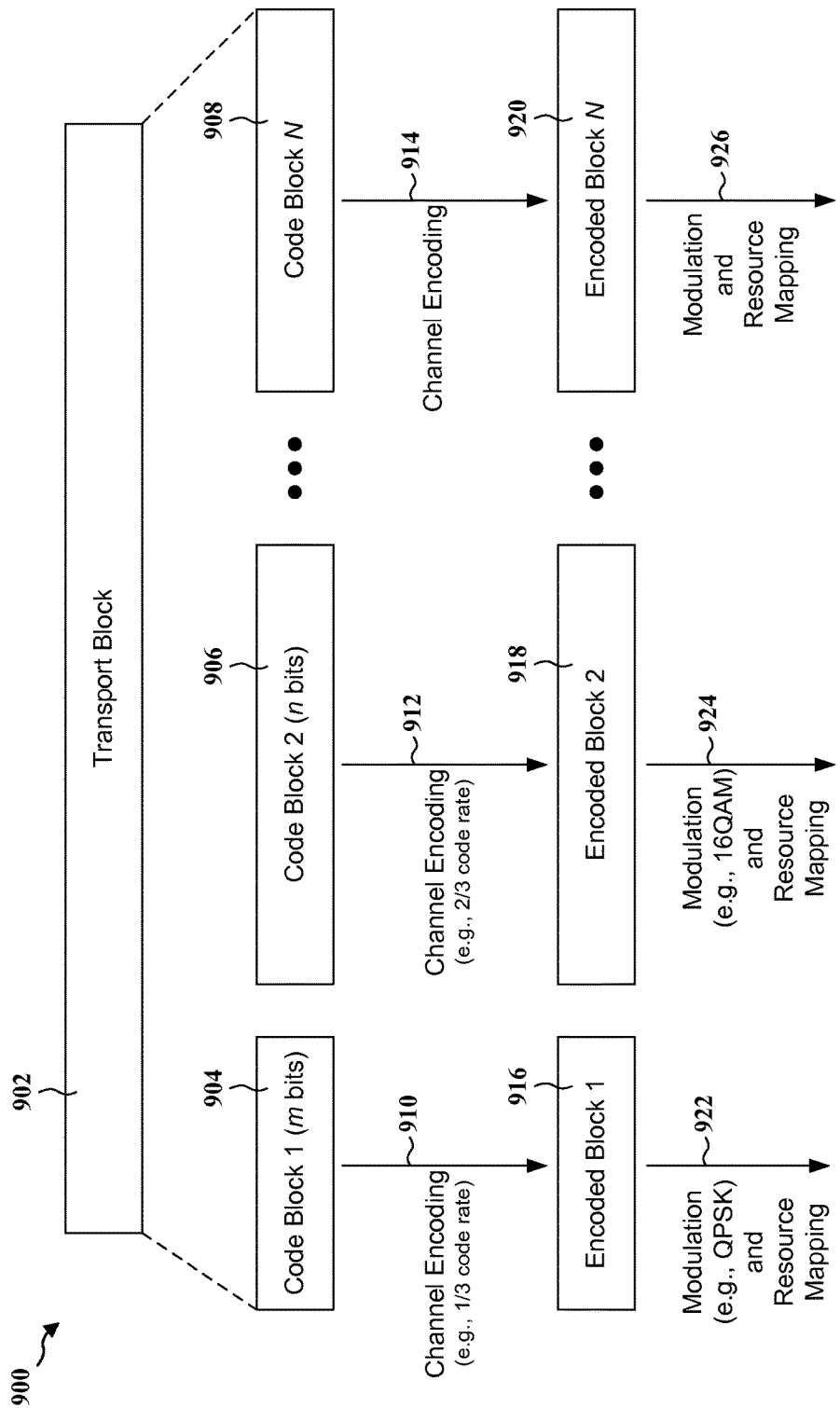
FIG. 9 is a diagram illustrating a data transmission scheme of a transmitter, in accordance with an embodiment of the present invention.

FIG. 9 is a diagram 900 illustrating a data transmission scheme of a transmitter in LTE in accordance with an embodiment of the present invention. In an aspect, the transmitter may be a UE or an eNB (also referred to as a base station). As shown in FIG. 9, a transport block 902 may be divided into two or more smaller code blocks (also referred to as sub-blocks), such as code block 1 904, code block 2 906, and code block N 908, where two or more of the code blocks have different block sizes. For example, the code block 1 904 may be m bits in size and the code block 2 906 may be n bits in size, where m is less than n. Accordingly, in this example, the size of code block 1 904 is smaller than the size of code block 2 906. In an aspect, some code blocks may have substantially different block sizes. However, the values of m and n may vary, where n may be less than m, or of similar size.

In an aspect, each code block is independently channel encoded (e.g., Turbo encoded) to generate an encoded block (also referred to as an encoded sub-block). For example, channel encoding 910 is performed on code block 1 904 to generate encoded block 1 916, channel encoding 912 is performed on code block 2 906 to generate encoded block 2 918, and channel encoding 914 is performed on code block N 908 to generate encoded block N 920. In an aspect, different code rates may be used for channel encoding 910, 912, and 914. In such aspect, each code rate may be selected based on the size of the code block, such that a lower code rate is selected for smaller code blocks. For example, if the code block 1 904 is smaller in size than the code block 2 906, a ⅓ code rate may be used for the code block 1 904 and a ⅔ code rate may be used for the code block 2 906. It should be understood that the specific examples for selecting code rates for the code blocks as described herein provide embodiments and that different code rates than those described in the specific examples may be used.

As further shown in FIG. 9, the encoded block 1 916, encoded block 2 918, and encoded block N 920 are each modulated and mapped to a number of resources (e.g., REs).

In an aspect, a modulation type and/or a modulation order used for one encoded block may be different than a modulation type and/or a modulation order used for another encoded block. In an aspect, the modulation type and/or the modulation order may be selected for the encoded blocks based on the size of the encoded blocks. For example, if the encoded block 1 916 is smaller in size than the encoded block 2 918, the encoded block 1 916 may be modulated 922 using QPSK and the encoded block 2 918 may be modulated 924 using 16 QAM. Accordingly, in such example, encoded block N 920 may be modulated 926 using an appropriate modulation order based on the size of the encoded block N 920.

In an aspect, the encoded blocks (e.g., encoded block 1 916, encoded block 2 918, and encoded block N 920) are sequentially mapped to a number of resources (e.g., REs). For downlink transmissions, the mapping is performed based on a frequency allocation followed by a time allocation. For uplink transmissions, the mapping is performed based on a time allocation followed by a frequency allocation. In an aspect, the encoded blocks (e.g., encoded block 1 916, encoded block 2 918, and encoded block N 920) may be interleaved and the interleaved encoded blocks may be sequentially mapped to a number of resources. For downlink transmissions, the mapping of the interleaved encoded blocks is performed based on a frequency allocation followed by a time allocation. For uplink transmissions, the mapping of the interleaved encoded blocks is performed based on a time allocation followed by a frequency allocation. In an aspect, the number of REs for an encoded block may vary. In an aspect, the number of REs for an encoded block may be a function of the block size. After the encoded blocks are mapped to a number of resources, the encoded blocks may be transmitted to one or more receivers.

In an aspect, the transmitter may generate and transmit a signal indicating that different sized encoded blocks associated with a transport block have been configured and/or indicating a size of one or more of the encoded blocks. In an aspect, the signal may explicitly indicate that different sized encoded blocks have been configured and/or may explicitly indicate a size of one or more of the encoded blocks through a control channel. In another aspect, the configuration of different sized encoded blocks and/or a size of one or more of the encoded blocks may be implicitly indicated based on a modulation and coding scheme (MCS)/transport block size (TBS) index, a number of RBs assigned for transmission, a number of layers transmitted, and/or a number of encoded blocks needed for the transmission.

It should be understood that the specific examples described herein provide embodiments and that the code block sizes, MCS, and coding rates may be varied and/or configured differently in other embodiments. Moreover, the specific examples indicate that certain blocks have different properties, however these are simply examples.

In an aspect, a receiver may receive the encoded blocks and may determine a decoding order for the encoded blocks based on the sizes of the encoded blocks. In an aspect, the receiver may be a UE or an eNB (also referred to as a base station). In an aspect, the receiver may be configured to decode an encoded block having the smallest size first. For example, the receiver may identify that one of the received encoded blocks is smaller in size than another of the received encoded blocks and may proceed to decode the smaller encoded block prior to the larger encoded block. In another aspect, the receiver may sequentially decode the encoded blocks without regard to size of the encoded blocks. In an aspect, the receiver may perform data-aided channel estimation for one or more of the encoded blocks based on information determined from decoding an encoded block having the smallest size. In an aspect, the receiver may receive the previously discussed signal indicating a size of one or more of the encoded blocks to determine the size of the encoded blocks.

It should be understood that since the encoded block having the smallest size may be encoded with a lower code rate and may be modulated with a lower modulation order with respect to larger sized encoded blocks, the receiver may have a higher probability of successfully decoding the encoded block having the smallest size.

Figure 10:
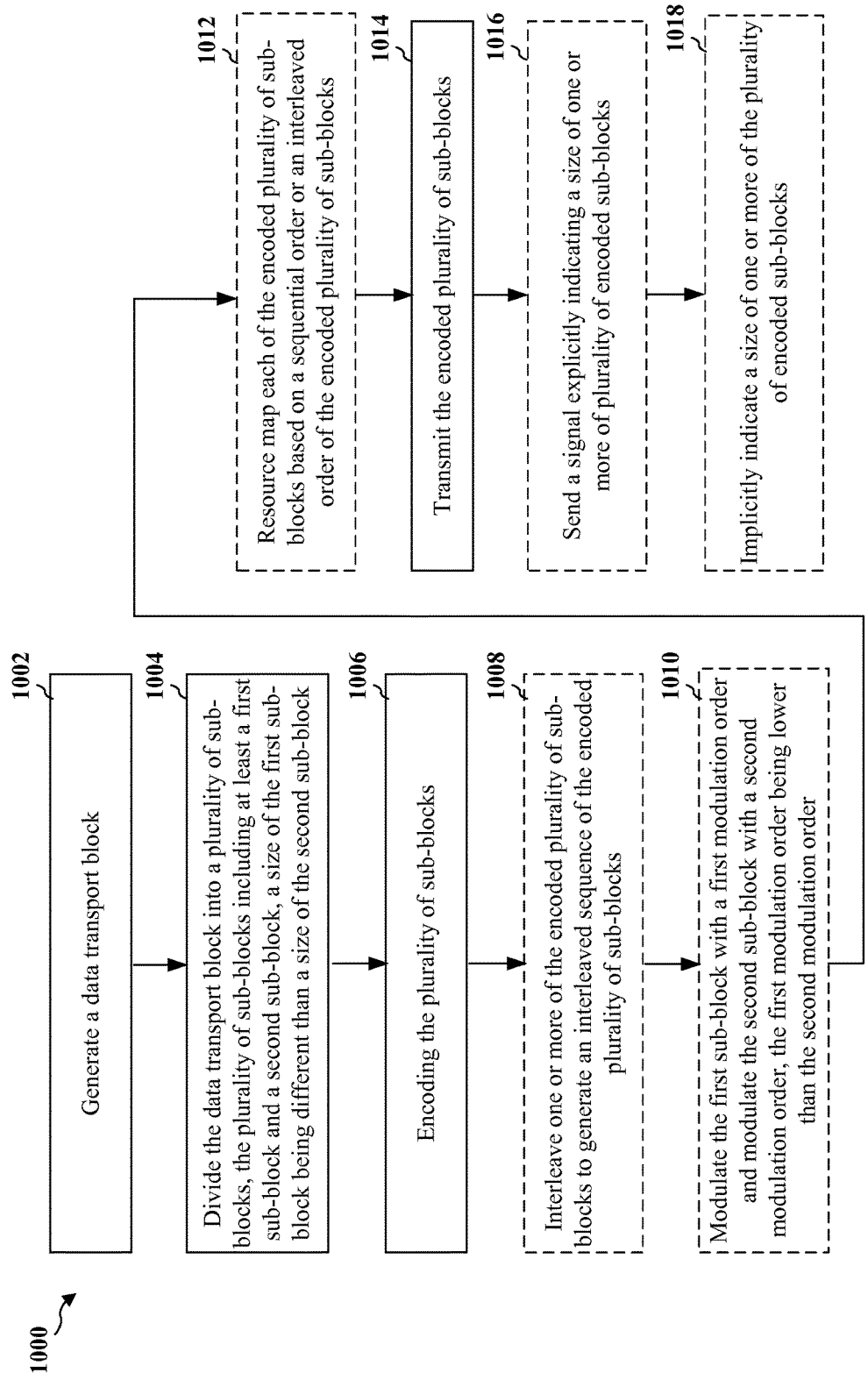
FIG. 10 is a flow chart of a method of wireless communication.

FIG. 10 is a flow chart 1000 of a method of wireless communication. The method may be performed by a transmitter, such as a UE or an eNB. It should be understood that the steps indicated by dashed lines in FIG. 10 are optional steps.

At step 1002, the transmitter generates a data transport block. For example, the data transport block (e.g., transport block 902 in FIG. 9) may be a MAC PDU generated by a MAC layer of the transmitter and may include data to be transmitted on a shared channel.

At step 1004, the transmitter divides the data transport block into a number of sub-blocks. For example, with reference to FIG. 9, the sub-blocks include at least a first sub-block (e.g., code block 1 904) and a second sub-block (e.g., code block 2 906). The size of the first sub-block is different than a size of the second sub-block. For example, code block 1 904 may be m bits in size and the code block 2 906 may be n bits in size. In an aspect, the size of the first sub-block is smaller than the size of the second sub-block.

At step 1006, the transmitter encodes the sub-blocks. In an aspect, when the size of the first sub-block is smaller than the size of the second sub-block, the transmitter encodes the first sub-block with a first code rate and encodes the second sub-block with a second code rate, the first code rate being lower than the second code rate. For example, with reference to FIG. 9, code block 1 904 may be channel encoded 910 with a ⅓ code rate and code block 2 906 may be channel encoded 912 with a ⅔ code rate.

At step 1008, the transmitter interleaves one or more of the encoded plurality of sub-blocks to generate an interleaved sequence of the encoded plurality of sub-blocks.

At step 1010, the transmitter modulates the first sub-block with a first modulation order and modulates the second sub-block with a second modulation order, the first modulation order being lower than the second modulation order. For example, with reference to FIG. 9, if the encoded block 1 916 is smaller in size than the encoded block 2 918, the encoded block 1 916 may be modulated 922 using QPSK and the encoded block 2 918 may be modulated 924 using 16 QAM.

At step 1012, the transmitter resource maps each of the encoded plurality of sub-blocks based on a sequential order or an interleaved sequence of the encoded plurality of sub-blocks. In an aspect, resource mapping is performed by determining a number of REs for each of the encoded plurality of sub-blocks, the number of REs being determined based on a size of each of the encoded plurality of sub-blocks, and mapping each of the encoded plurality of sub-blocks to the determined number of REs.

At step 1014, the transmitter transmits the encoded plurality of sub-blocks.

At step 1016, the transmitter sends a signal explicitly indicating a size of one or more of plurality of encoded sub-blocks.

At step 1018, the transmitter implicitly indicates a size of one or more of the plurality of encoded sub-blocks based on one or more of: a combination of the modulation and coding schemes and transport block index, a number of RBs in the transmission, a number of layers transmitted in the transmission, a number of sub-blocks in the transmission or a combination thereof.

It should be understood that one or more of the steps described supra with respect to FIG. 10 may be implemented independently. For example, a transport block may be divided into sub-blocks with different block sizes, may be encoded using different coding rates, and may be modulated with different modulation orders. Alternatively, one or a combination of such operations may be performed. For example, a first sub-block (e.g., code block 1 904) and a second sub-block (e.g., code block 2 906) may have different sizes and may be encoded with different code rates, however, the modulation order applied to the encoded first and second sub-blocks may be the same.

Figure 11:
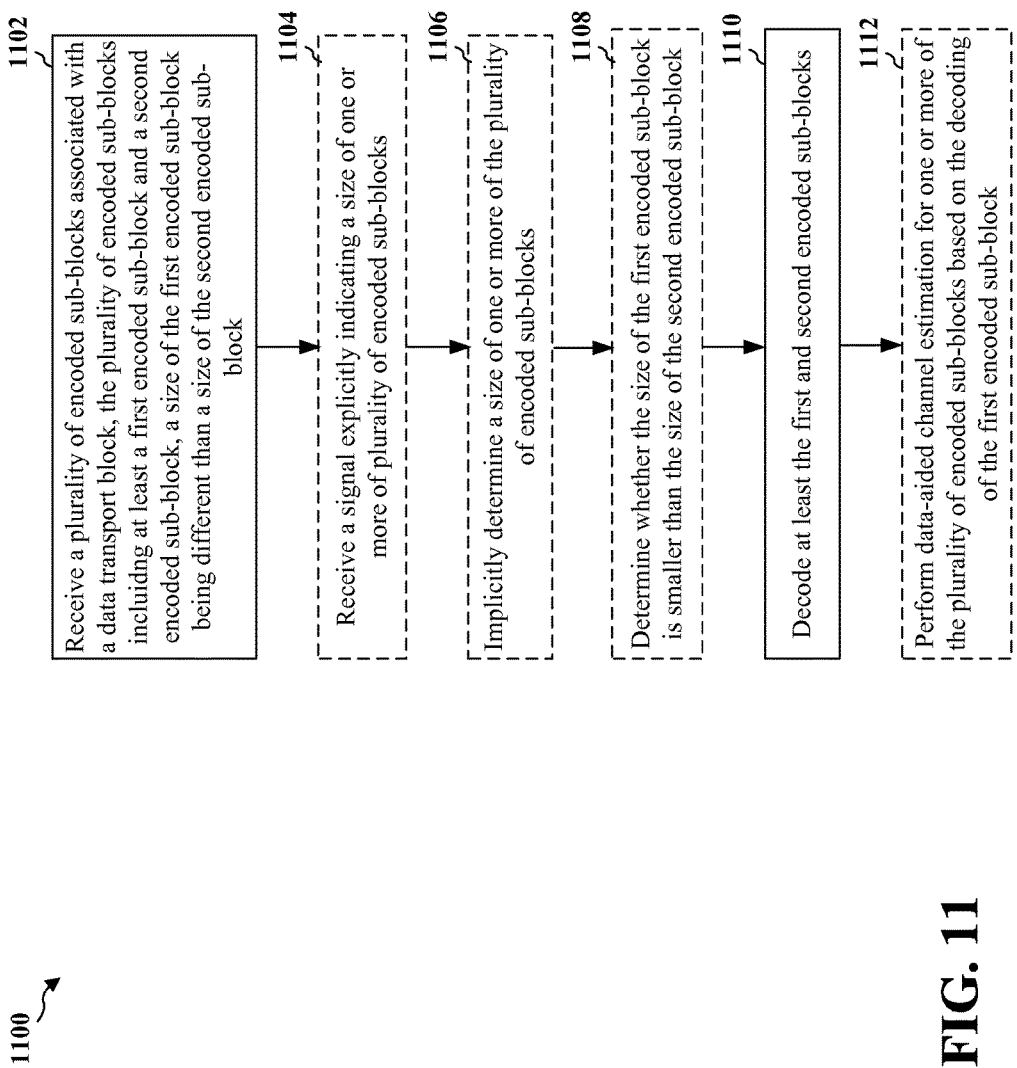
FIG. 11 is a flow chart of a method of wireless communication.

FIG. 11 is a flow chart 1100 of a method of wireless communication. The method may be performed by a receiver, such as a UE or an eNB. It should be understood that the steps indicated by dashed lines in FIG. 11 are optional steps.

At step 1102, the receiver receives a plurality of encoded sub-blocks associated with a data transport block, the plurality of encoded sub-blocks comprising at least a first encoded sub-block and a second encoded sub-block, a size of the first encoded sub-block being different than a size of the second encoded sub-block. In an aspect, the size of the first encoded sub-block is smaller than the size of the second encoded sub-block, and a code rate of the first encoded sub-block is lower than a code rate of the second encoded sub-block. In such aspect, a modulation order of the first encoded sub-block is lower than a modulation order of the second encoded sub-block.

At step 1104, the receiver receives a signal explicitly indicating a size of one or more of plurality of encoded sub-blocks.

At step 1106, the receiver determines a size of one or more of the plurality of encoded sub-blocks based on one or more of: a combination of the modulation and coding schemes and transport block index, a number of RBs in the transmission, a number of layers transmitted in the transmission, a number of sub-blocks in the transmission, or a combination thereof.

At step 1108, the receiver determines whether the size of the first encoded sub-block is smaller than the size of the second encoded sub-block.

At step 1110, the receiver decodes at least the first and second encoded sub-blocks. In an aspect, the receiver decodes the first encoded sub-block prior to the second encoded sub-block when the size of the first encoded sub-block is determined to be smaller than the size of the second encoded sub-block.

At step 1112, the receiver performs data-aided channel estimation for one or more of the plurality of encoded sub-blocks based on the decoding of the first encoded sub-block.

Figure 12:
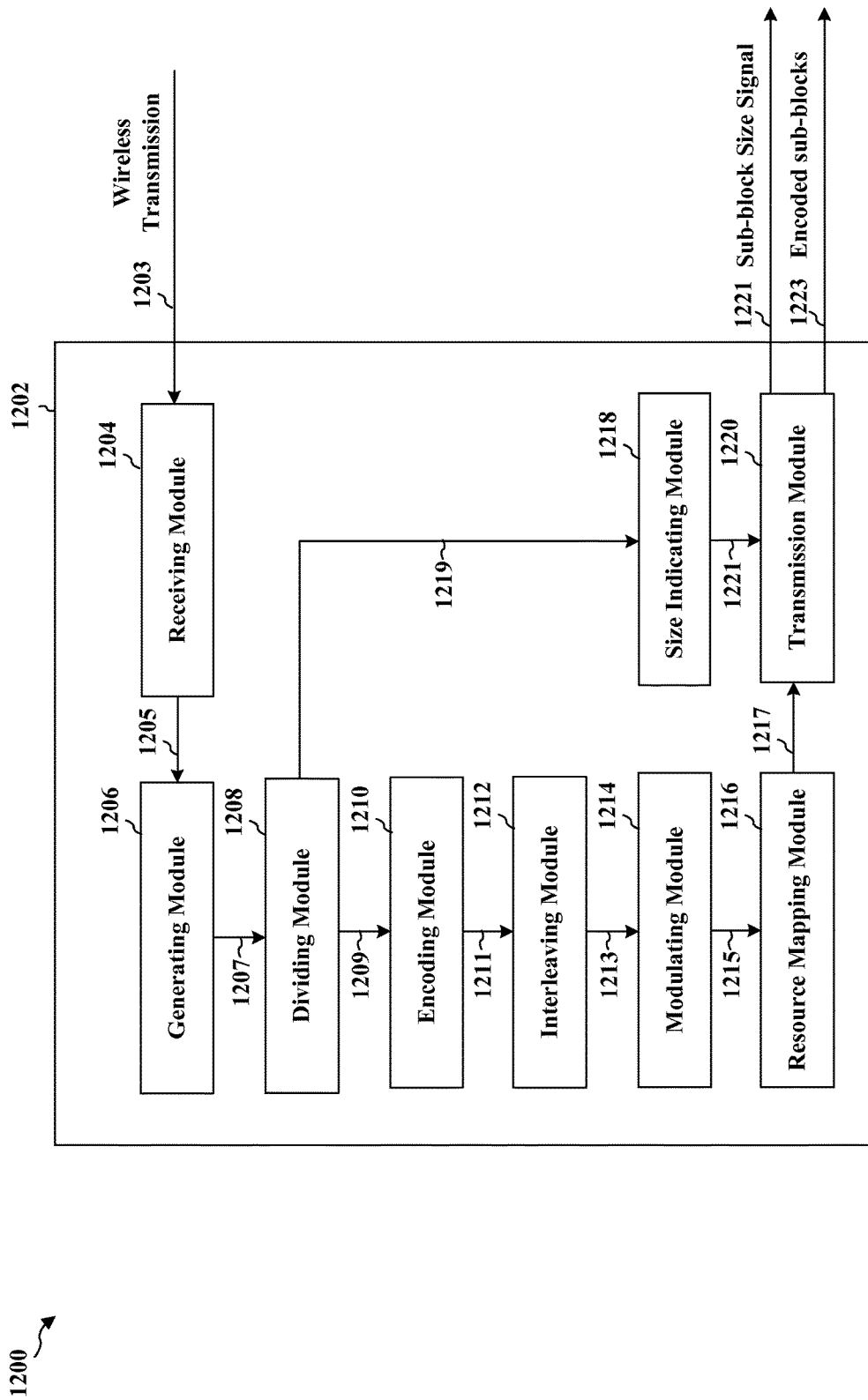
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus may be a transmitter, such as a UE or an eNB. The apparatus includes a receiving module 1204 that receives wireless transmissions 1203 from a transmitter. The apparatus further includes a generating module 1206 that generates a data transport block. In an aspect, the transport block may be generated based on data 1205 provided by the receiving module. The apparatus further includes a dividing module 1208 that divides the data transport block 1207 from the generating module 1206 into a number of sub-blocks. The apparatus further includes an encoding module 1210 that encodes the sub-blocks 1209 from the dividing module 1208. The apparatus further includes an interleaving module 1212 that interleaves one or more of the encoded sub-blocks 1211 from the encoding module 1210 to generate an interleaved sequence 1213 of the encoded sub-blocks. The apparatus further includes a modulating module 1214 that modulates a first sub-block with a first modulation order and modulates a second sub-block with a second modulation order. The apparatus further includes a resource mapping module 1216 that resource maps each of the encoded sub-blocks 1215 based on a sequential order of the encoded sub-blocks or based on an interleaved sequence, and provides the resource mapped sub-blocks 1217 to the transmission module 1220. The apparatus further includes a size indicating module 1218 that receives sub-block size information 1219 and sends (via the transmission module 1220) a signal 1221 that explicitly indicates a size of one or more of the encoded sub-blocks or implicitly indicates a size of one or more of the encoded sub-blocks. The apparatus further includes a module 1220 that transmits the encoded sub-blocks 1223.

The apparatus may include additional modules that perform each of the steps of the algorithm in the aforementioned flow chart of FIG. 10. As such, each step in the aforementioned flow chart of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
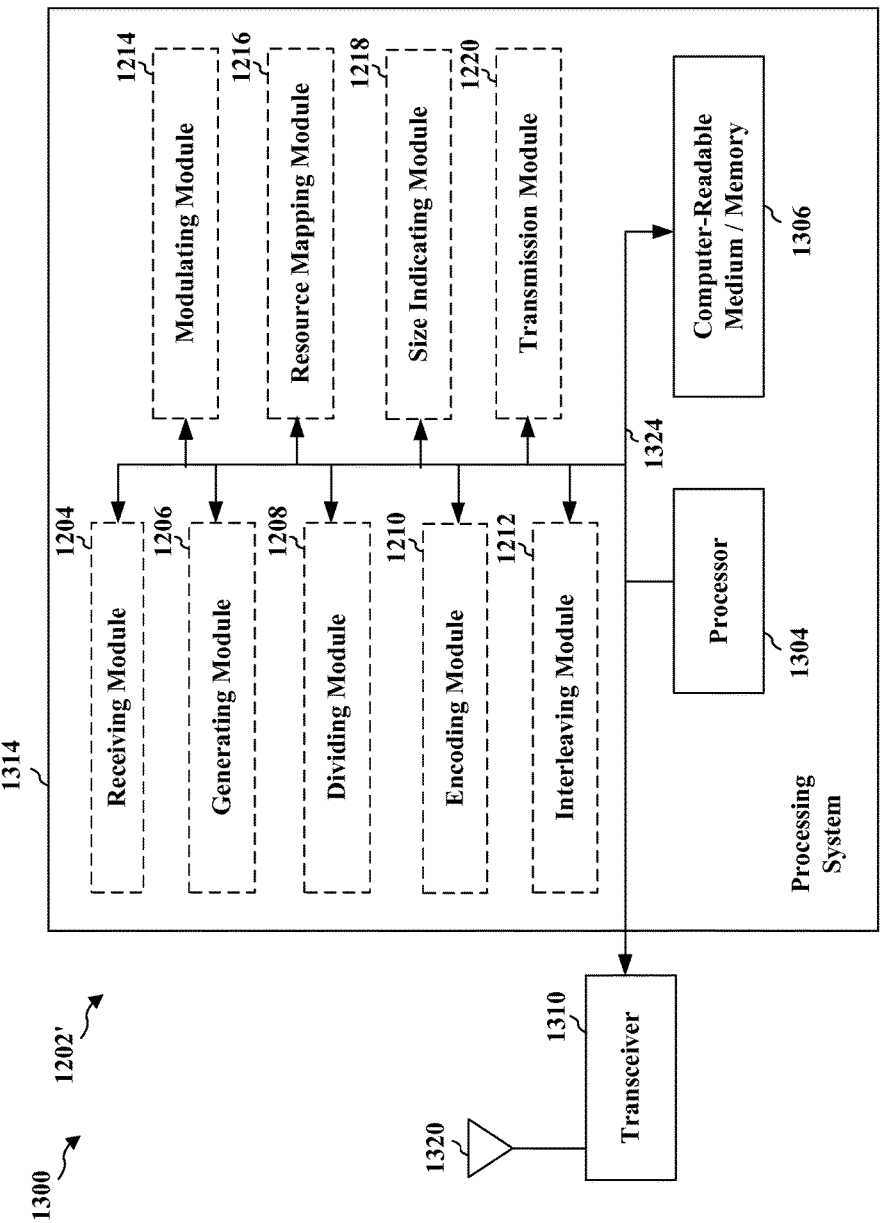
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, 1208, 1210, 1212, 1214, 1216, 1218, and 1220 and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the receiving module 1204. In addition, the transceiver 1310 receives information from the processing system 1314, specifically the transmission module 1220, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system further includes at least one of the modules 1204, 1206, 1208, 1210, 1212, 1214, 1216, 1218, or 1220. The modules may be software modules running in the processor 1304, resident/stored in the computer readable medium/memory 1306, one or more hardware modules coupled to the processor 1304, or some combination thereof. In an aspect, the processing system 1314 may be a component of the eNB 610 and may include the memory 676 and/or at least one of the TX processor 616, the RX processor 670, or the controller/processor 675. In another aspect, the processing system 1314 may be a component of the UE 650 and may include the memory 660 and/or at least one of the TX processor 668, the RX processor 656, or the controller/processor 659.

In one configuration, the apparatus 1202/1202' for wireless communication includes means for generating a data transport block, means for dividing the data transport block into a plurality of sub-blocks, means for encoding the plurality of sub-blocks, means for transmitting the encoded plurality of sub-blocks, means for modulating the first sub-block with a first modulation order and modulating the second sub-block with a second modulation order, means for resource mapping each of the encoded plurality of sub-blocks based on a sequential order of the encoded plurality of sub-blocks, means for interleaving one or more of the encoded plurality of sub-blocks to generate an interleaved sequence of the encoded plurality of sub-blocks, means for resource mapping each of the encoded plurality of sub-blocks based on the interleaved sequence, means for sending a signal explicitly indicating a size of one or more of plurality of encoded sub-blocks, and means for implicitly indicating a size of one or more of the plurality of encoded sub-blocks. The aforementioned means may be one or more of the aforementioned modules of the apparatus 1202 and/or the processing system 1314 of the apparatus 1202' configured to perform the functions recited by the aforementioned means. In an aspect, and as described supra, the processing system 1314 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means. In another aspect, and as described supra, the processing system 1314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 14:
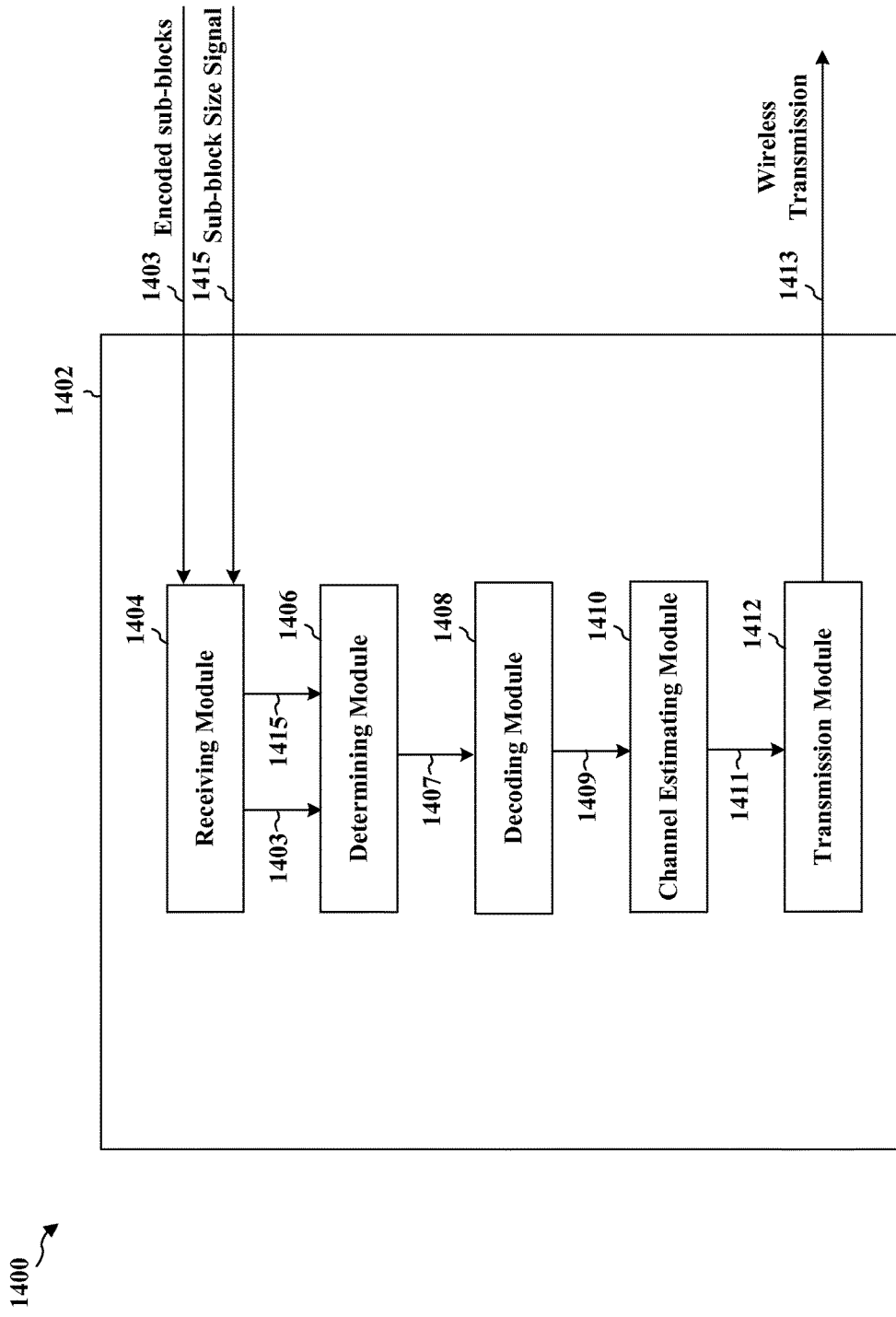
FIG. 14 is a conceptual data flow diagram illustrating the data flow between different modules/means/components in an exemplary apparatus.

FIG. 14 is a conceptual data flow diagram 1400 illustrating the data flow between different modules/means/components in an exemplary apparatus 1402. The apparatus may be a receiver, such as a UE or an eNB. The apparatus includes a receiving module 1404 that receives a number of encoded sub-blocks 1403 associated with a data transport block and/or receives a signal 1415 explicitly indicating a size of one or more of plurality of encoded sub-blocks, a determining module 1406 that explicitly or implicitly determines a size of one or more of the encoded sub-blocks, and a decoding module 1408 that decodes at least the first and second encoded sub-blocks of the encoded sub-blocks 1407 received from the determining module 1406. The apparatus further includes a channel estimating module 1410 that performs data-aided channel estimation for one or more of the encoded sub-blocks based on the decoded first encoded sub-block 1409. The apparatus further includes a transmission module 1412 that transmits wireless transmissions 1413. In an aspect, the wireless transmissions 1413 may be based on data 1411 associated with the decoded first encoded sub-block.

The apparatus may include additional modules that perform each of the steps of the algorithm in the aforementioned flow chart of FIG. 11. As such, each step in the aforementioned flow chart of FIG. 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
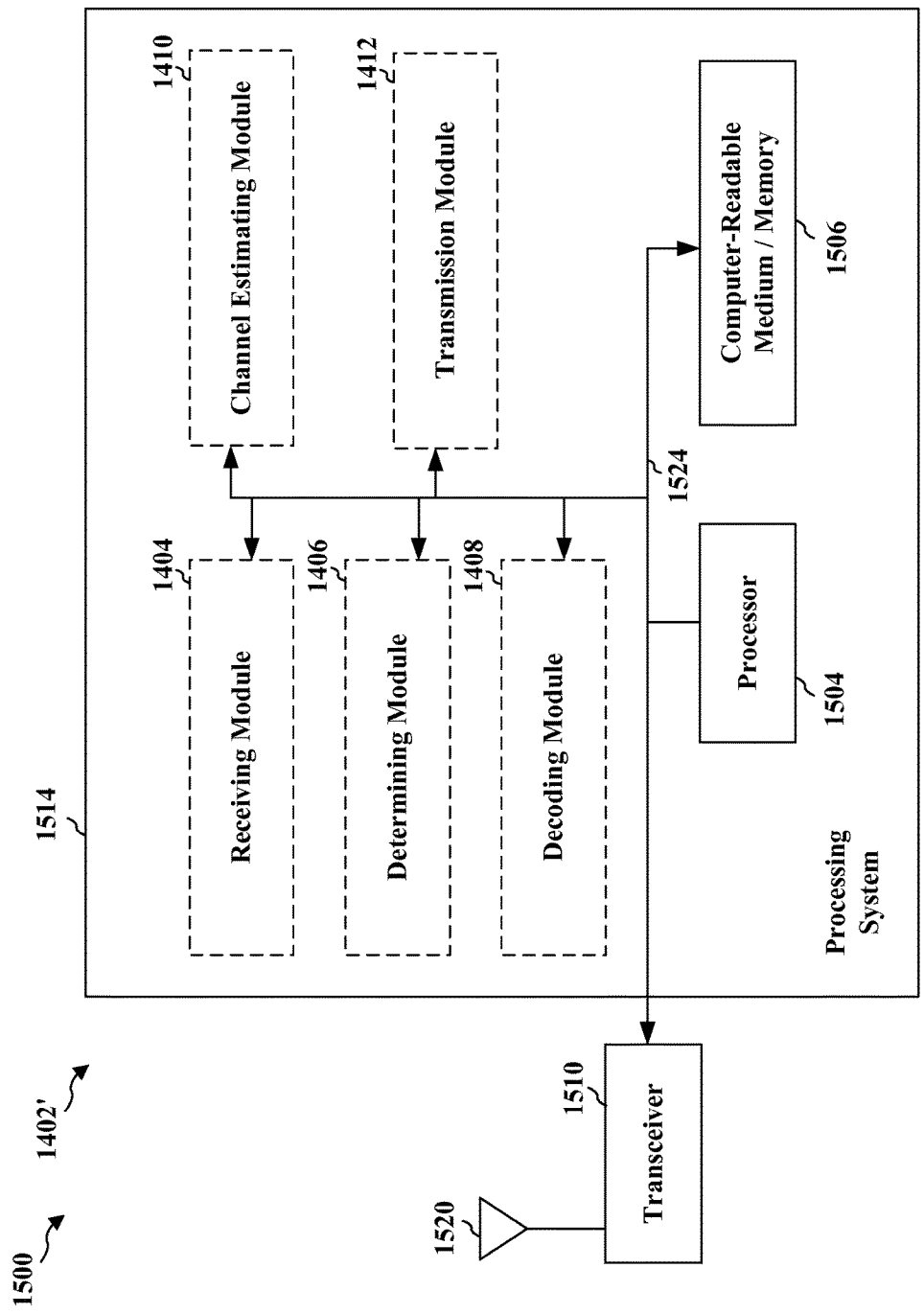
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the modules 1404, 1406, 1408, 1410, and 1412, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the receiving module 1404. In addition, the transceiver 1510 receives information from the processing system 1514, specifically the transmission module 1412, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system further includes at least one of the modules 1404, 1406, 1408, 1410, or 1412. The modules may be software modules running in the processor 1504, resident/stored in the computer readable medium/memory 1506, one or more hardware modules coupled to the processor 1504, or some combination thereof. In an aspect, the processing system 1514 may be a component of the eNB 610 and may include the memory 676 and/or at least one of the TX processor 616, the RX processor 670, or the controller/processor 675. In another aspect, the processing system 1514 may be a component of the UE 650 and may include the memory 660 and/or at least one of the TX processor 668, the RX processor 656, or the controller/processor 659.

In one configuration, the apparatus 1402/1402' for wireless communication includes means for receiving a plurality of encoded sub-blocks associated with a data transport block, the plurality of encoded sub-blocks comprising at least a first encoded sub-block and a second encoded sub-block, means for decoding at least the first and second encoded sub-blocks, means for performing data-aided channel estimation for one or more of the plurality of encoded sub-blocks based on the decoding of the first encoded sub-block, means for receiving a signal explicitly indicating a size of one or more of plurality of encoded sub-blocks, and means for determining a size of one or more of the plurality of encoded sub-blocks. The aforementioned means may be one or more of the aforementioned modules of the apparatus 1402 and/or the processing system 1514 of the apparatus 1402' configured to perform the functions recited by the aforementioned means. In an aspect, and as described supra, the processing system 1514 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means. In another aspect, and as described supra, the processing system 1514 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication at a base station, comprising:
    generating a data transport block;
    dividing the data transport block into a plurality of sub-blocks prior to encoding, the plurality of sub-blocks comprising at least a first sub-block and a second sub-block, a first size of the first sub-block being smaller than a second size of the second sub-block and a first position of the first sub-block being closer to a beginning of the data transport block than a second position of the second sub-block;
    encoding the plurality of sub-blocks;
    transmitting a reference signal (RS); and
    transmitting the encoded plurality of sub-blocks, wherein the first, smaller encoded sub-block is transmitted in the first position closer to the beginning of the data transport block than the second position of the second sub-block.

2. The method of claim 1, wherein the size of the first sub-block is smaller than the size of the second sub-block, the encoding comprising encoding the first sub-block with a first code rate and encoding the second sub-block with a second code rate, the first code rate being lower than the second code rate.

3. The method of claim 2, wherein the first sub-block is encoded with a first code rate that is lower than a second code rate of the second sub-block, and wherein the first position of the first sub-block is closer to the beginning of the data transport block than the second position of the second sub-block.

4. The method of claim 1, wherein the size of the first encoded sub-block is smaller than the size of the second encoded sub-block, the method further comprising modulating the first sub-block with a first modulation order and modulating the second sub-block with a second modulation order, the first modulation order being lower than the second modulation order.

5. The method of claim 4, wherein the first modulation order of the first sub-block is lower than the modulation order of the second sub-block, and wherein the first position of the first sub-block is closer to the beginning of the data transport block than the second position of the second sub-block.

6. The method of claim 1, wherein the first sub-block and second sub-block are encoded using different encoding schemes, the different encoding schemes comprising at least one of convolutional encoding, Turbo encoding, or low-density parity-check (LDPC) encoding.

7. The method of claim 1, further comprising resource mapping each of the encoded plurality of sub-blocks based on a sequential order of the encoded plurality of sub-blocks, the resource mapping comprising:

determining a number of resource elements (REs) for each of the encoded plurality of sub-blocks, the number of REs being determined based on a size of each of the encoded plurality of sub-blocks; and
mapping each of the encoded plurality of sub-blocks to the determined number of REs, wherein the reference signal is multiplexed with the determined number of REs.

8. The method of claim 1, further comprising:
interleaving one or more of the encoded plurality of sub-blocks to generate an interleaved sequence of the encoded plurality of sub-blocks; and
resource mapping each of the encoded plurality of sub-blocks based on the interleaved sequence.

9. The method of claim 1, further comprising sending a signal explicitly indicating a size of one or more of plurality of encoded sub-blocks.

10. The method of claim 1, further comprising implicitly indicating a size of one or more of the plurality of encoded sub-blocks based on one or more of:
a combination of modulation and coding schemes and transport block index;
a number of RBs in the transmission;
a number of layers transmitted in the transmission;
a number of sub-blocks in the transmission; or
a combination thereof.

11. The method of claim 1, further comprising:
mapping each of the encoded plurality of sub-blocks to a number of resource elements (REs) based on the size of each of the plurality of sub-blocks; and
multiplexing a reference signal with the REs.

12. The method of claim 1, wherein the size and position of the first, smaller sub-block assists a receiver in performing data aided channel estimation for the second, larger sub-block based on decoding of the first, smaller sub-block.

13. A method of wireless communication at a user equipment, comprising:
receiving a reference signal (RS);
receiving a plurality of encoded sub-blocks associated with a data transport block and a reference signal from a base station, the plurality of encoded sub-blocks comprising at least a first encoded sub-block and a second encoded sub-block, a size of the first encoded sub-block being smaller than a size of the second encoded sub-block and a first position of the first sub-block is closer to a beginning of the data transport block than a second position of the second sub-block;
decoding at least the first, smaller encoded sub-block; and
performing data-aided channel estimation for the second encoded sub-block based on the decoding of the first, smaller encoded sub-block.

14. The method of claim 13, wherein:
the size of the first encoded sub-block is smaller than the size of the second encoded sub-block; and
a code rate of the first encoded sub-block is lower than a code rate of the second encoded sub-block.

15. The method of claim 14, wherein the first sub-block is encoded with a first code rate of the first sub-block lower than a second code rate of the second sub-block, and wherein the first position of the first sub-block is closer to the beginning of the data transport block than the second position of the second sub-block.

16. The method of claim 13, wherein:
the size of the first encoded sub-block is smaller than the size of the second encoded sub-block; and
a modulation order of the first encoded sub-block is lower than a modulation order of the second encoded sub-block.

17. The method of claim 16, wherein a first modulation order of the first sub-block is lower than the modulation order of the second sub-block, and wherein the first position of the first sub-block is closer to the beginning of the data transport block than the second position of the second sub-block.

18. The method of claim 13, wherein the decoding at least the first and second encoded sub-blocks comprises:
determining whether the size of the first encoded sub-block is smaller than the size of the second encoded sub-block; and
decoding the first encoded sub-block prior to the second encoded sub-block when the size of the first encoded sub-block is determined to be smaller than the size of the second encoded sub-block.

19. The method of claim 13, further comprising receiving a signal explicitly indicating a size of one or more of plurality of encoded sub-blocks.

20. The method of claim 13, further comprising determining a size of one or more of the plurality of encoded sub-blocks based on one or more of:
a combination of modulation and coding schemes and transport block index;
a number of RBs in the transmission;
a number of layers transmitted in the transmission;
a number of sub-blocks in the transmission; or
a combination thereof.

21. The method of claim 13, wherein each of the encoded plurality of sub-blocks are mapped to a number of resource elements (REs) based on the size of each of the plurality of sub-blocks, and wherein the RS is multiplexed with resource elements of the first and second encoded sub-blocks.

22. An apparatus for wireless communication at a base station, comprising:
a memory; and
at least one processor coupled to the memory and configured to:
generate a data transport block;
divide the data transport block into a plurality of sub-blocks prior to encoding, the plurality of sub-blocks comprising at least a first sub-block and a second sub-block, a first size of the first sub-block being smaller than a second size of the second sub-block and a first position of the first sub-block being closer to a beginning of the data transport block than a second position of the second sub-block;
encode the plurality of sub-blocks;
transmit a reference signal (RS); and
transmit the encoded plurality of sub-blocks, wherein the first, smaller encoded sub-block is transmitted in the first position closer to the beginning of the data transport block than the second position of the second sub-block.

23. The apparatus of claim 22, wherein the at least one processor is further configured to encode the plurality of sub-blocks is configured to encode the first sub-block with a first code rate and encode the second sub-block with a second code rate, the first code rate being lower than the second code rate.

24. The apparatus of claim 22, wherein the at least one processor is further configured to modulate the first sub-block with a first modulation order and modulate the second sub-block with a second modulation order, the first modulation order being lower than the second modulation order.

25. The apparatus of claim 22, wherein the first sub-block and second sub-block are encoded using different encoding schemes, the different encoding schemes comprising at least one of convolutional encoding, Turbo encoding, or low-density parity-check (LDPC) encoding.

26. The apparatus of claim 25, the at least one processor further configured to resource map each of the encoded plurality of sub-blocks based on a sequential order of the encoded plurality of sub-blocks, the at least one processor further configured to:
determine a number of resource elements (REs) for each of the encoded plurality of sub-blocks, the number of REs being determined based on a size of each of the encoded plurality of sub-blocks; and
map each of the encoded plurality of sub-blocks to the determined number of REs, wherein the reference signal is multiplexed with the determined number of REs.

27. The apparatus of claim 22, the at least one processor further configured to:
interleave one or more of the encoded plurality of sub-blocks to generate an interleaved sequence of the encoded plurality of sub-blocks; and
resource map each of the encoded plurality of sub-blocks based on the interleaved sequence.

28. The apparatus of claim 22, the at least one processor further configured to send a signal explicitly indicating a size of one or more of plurality of encoded sub-blocks.

29. The apparatus of claim 22, the at least one processor further configured to implicitly indicate a size of one or more of the plurality of encoded sub-blocks based on one or more of:
a combination of modulation and coding schemes and transport block index;
a number of RBs in the transmission;
a number of layers transmitted in the transmission;
a number of sub-blocks in the transmission; or
a combination thereof.

30. An apparatus for wireless communication at a user equipment, comprising:
a memory; and
at least one processor coupled to the memory and configured to:
receive a reference signal (RS);
receive a plurality of encoded sub-blocks associated with a data transport block and a reference signal from a base station, the plurality of encoded sub-blocks comprising at least a first encoded sub-block and a second encoded sub-block, a size of the first encoded sub-block being smaller than a size of the second encoded sub-block and a first position of the first sub-block is closer to a beginning of the data transport block than a second position of the second sub-block;
decode at least the first, smaller encoded sub-block; and
perform data-aided channel estimation for the second encoded sub-block based on the decoding of the first, smaller encoded sub-block.

31. The apparatus of claim 30, wherein:
a code rate of the first encoded sub-block is lower than a code rate of the second encoded sub-block.

32. The apparatus of claim 30, wherein:
a modulation order of the first encoded sub-block is lower than a modulation order of the second encoded sub-block.

33. The apparatus of claim 30, wherein the at least one processor configured to decode the at least the first and second encoded sub-blocks is configured to:
determine whether the size of the first encoded sub-block is smaller than the size of the second encoded sub-block; and
decode the first encoded sub-block prior to the second encoded sub-block when the size of the first encoded sub-block is determined to be smaller than the size of the second encoded sub-block.

34. The apparatus of claim 30, the at least one processor further configured to receive a signal explicitly indicating a size of one or more of plurality of encoded sub-blocks.

35. A non-transitory computer-readable medium storing computer executable code for wireless communication at a base station, comprising code to:
generate a data transport block;
divide the data transport block into a plurality of sub-blocks prior to encoding, the plurality of sub-blocks comprising at least a first sub-block and a second sub-block, a first size of the first sub-block being smaller than a second size of the second sub-block and a first position of the first sub-block being closer to a beginning of the data transport block than a second position of the second sub-block;
encode the plurality of sub-blocks;
transmit a reference signal; and
transmit the encoded plurality of sub-blocks, wherein the first, smaller encoded sub-block is transmitted in the first position closer to the beginning of the data transport block than the second position of the second sub-block.

36. A non-transitory computer-readable medium storing computer executable code for wireless communication at a user equipment, comprising code for:
receiving a reference signal (RS);
receiving a plurality of encoded sub-blocks associated with a data transport block and a reference signal from a base station, the plurality of encoded sub-blocks comprising at least a first encoded sub-block and a second encoded sub-block, a size of the first encoded sub-block being smaller than a size of the second encoded sub-block and a first position of the first sub-block is closer to a beginning of the data transport block than a second position of the second sub-block;
decoding at least the first, smaller encoded sub-block; and
performing data-aided channel estimation for the second encoded sub-block based on the decoding of the first, smaller encoded sub-block.

37. An apparatus for wireless communication at a base station, comprising:
means for generating a data transport block;
means for dividing the data transport block into a plurality of sub-blocks prior to encoding, the plurality of sub-blocks comprising at least a first sub-block and a second sub-block, a first size of the first sub-block being smaller than a second size of the second sub-block and a first position of the first sub-block being closer to a beginning of the data transport block than a second position of the second sub-block; and
means for transmitting a reference signal (RS) and the encoded plurality of sub-blocks, wherein the first, smaller encoded sub-block is transmitted in the a first position closer to the beginning of the data transport block than the second position of the second sub-block.

38. An apparatus for wireless communication at a user equipment, comprising:

means for receiving a reference signal (RS) and a plurality of encoded sub-blocks associated with a data transport block and a reference signal from a base station, the plurality of encoded sub-blocks comprising at least a first encoded sub-block and a second encoded sub-block, a size of the first encoded sub-block being smaller than a size of the second encoded sub-block and a first position of the first sub-block is closer to a beginning of the data transport block than a second position of the second sub-block;

means for decoding at least the first, smaller encoded sub-block; and means for performing data-aided channel estimation for the second encoded sub-block based on the decoding of the first, smaller encoded sub-block.

* * * * *